United States Patent
Jeong

(10) Patent No.: US 7,908,616 B2
(45) Date of Patent: Mar. 15, 2011

(54) MEASURING AUDIENCE VIEWERSHIP OF ONLINE LIVE BROADCAST

(75) Inventor: Woo-Jin Jeong, Seoul (KR)

(73) Assignee: CDNetworks Co., Ltd., Seoul (KR)

( * ) Notice: Subject to any disclaimer, the term of this patent is extended or adjusted under 35 U.S.C. 154(b) by 0 days.

(21) Appl. No.: 12/616,688

(22) Filed: Nov. 11, 2009

(65) Prior Publication Data

US 2010/0162283 A1 Jun. 24, 2010

(30) Foreign Application Priority Data

Dec. 23, 2008 (KR) .................. 10-2008-0132386

(51) Int. Cl.
- H04N 7/16 (2006.01)
- G06Q 30/00 (2006.01)
- H04N 7/173 (2006.01)
- H04N 17/00 (2006.01)

(52) U.S. Cl. ............. 725/9; 725/16; 725/20; 725/22; 725/24; 348/192; 705/14.41; 705/14.43; 705/14.44; 705/14.45

(58) Field of Classification Search ............ 725/9, 16, 725/20, 22, 24; 348/192; 705/14.41, 14.43, 705/14.44, 14.45
See application file for complete search history.

(56) References Cited

U.S. PATENT DOCUMENTS

2009/0213916 A1 * 8/2009 Liu et al. ............ 375/220

FOREIGN PATENT DOCUMENTS

| KR | 2003-0020868 A | 3/2003 |
| KR | 2005-0029936 A | 3/2005 |
| KR | 2006-0058392 A | 5/2006 |
| KR | 2008-0000968 A | 1/2008 |

* cited by examiner

Primary Examiner — Hoang-Vu A Nguyen-Ba
(74) Attorney, Agent, or Firm — Fenwick & West LLP

(57) ABSTRACT

Method and apparatus for measuring an audience viewership of an online live broadcast are provided. Code information included in live broadcast data is received from the encoding server or the media server, transmission information of the live broadcast data to the client is received from the media server, the transmission information is compensated using the code information, and the audience viewership of the online live broadcast is computed using the compensated transmission information. It is possible to obtain the accurate viewership of an online live broadcast and to obtain the accurate viewership of the online live broadcast even when users erroneously access a web page or intentionally access the web page to increase the number of page views.

16 Claims, 3 Drawing Sheets

MEASURING AUDIENCE VIEWERSHIP OF ONLINE LIVE BROADCAST

BACKGROUND

1. Field of Art

The present invention relates to measuring audience viewership, and more particularly, to accurately measuring audience viewership of an online live broadcast program provided through a communication network.

2. Description of Art

Various programs are broadcast over various broadcasting systems including an over-the-air broadcasting system, a cable broadcasting system, and a satellite broadcasting system. The Internet has recently emerged as a medium for online live broadcasting of programs to viewers. In the online live broadcast services, scenes of live events are captured by a camera and streamed to the viewers through the Internet in real time. Programs available over-the-air broadcasting or cable broadcasting may also be streamed to the users via the Internet.

In the online live broadcast services, an audience viewership survey may be performed to collect the users' preference, liking or disliking of a program in a manner similar to what is done for over-the-air broadcasting. To measure audience viewership for live over-the-air broadcasting, a survey is performed on sample audiences using telephone interviews in which surveyors call and interview the sample audiences. Surveyors record answers from the sample audiences watching the broadcasted program at certain times of the day and tally the answers to obtain the audience viewership. Such method of calling and interviewing the audiences takes a long time and incurs a large amount of cost because individual phone calls must be made and conducted by the surveyors. Further, the limited number of sample audiences results in a wider margin of errors and inaccurate audience viewership measurements.

For programs broadcast over the Internet, the audience viewership may be determined using the number of transmission requests for the content item through the Internet. This method is widely used in measuring audience viewership for programs broadcast over the Internet. Unlike the online broadcast of content items stored in advance and later transmitted to the users, the viewership of the streamed programs through the Internet in real time are often measured with respect to a specific point of time.

In the online live broadcast programs covering live events are captured by a camera, encoded, and then transmitted to the users through the Internet. Due to the delay associated with the encoding, transmitting data packets, and the loading or the buffering of data, data packets of the programs may be processed at different times in different components of a broadcasting system. For example, assuming that a national soccer team scored a goal at 7:50 pm, the time at which the live broadcast data is completely encoded by an encoding server and then transmitted to the media server may be 7:51 pm. Data for the scoring scene may be transmitted to the users at a later time (e.g., 7:52 pm). Due to further delay associated with the transmission, the users may view the scoring scene at 7:53 pm. That is, the users of an online live broadcasting program may view a scene of a live event at a time that may lag behind the actual event by some amount of time.

The audience rating survey of the online live broadcast program, however, does not take into account the lag between the time for receiving the data and transmitting the data to the clients. Therefore, in the above-mentioned example, an inaccurate survey may be performed by collecting the viewership associated with the scoring scene at 7:50 pm (time when the national soccer team actually scored a goal) and not at 7:53 pm (time when the event was actually viewed by the users).

Conventionally, the audience rating survey of an online live broadcast program is made using the number of clients served with the live broadcast data represented by the number of transmissions of a web page associated with the program along with the time when the data are transmitted to the clients. However, the number of clients having received the live broadcast data or the page view information is included in the rating even when users erroneously access the web page or intentionally clicks to enhance the number of page views.

SUMMARY

Embodiments relate to measuring viewership of an online live broadcast program in a rating server of an online live broadcast rating measuring system, the online live broadcast rating measuring system including a client, an encoding server, a media server, and the rating server. Code information included in live broadcast data is received from the encoding server or the media server. Transmission information of the live broadcast data to the client from the media server is received. The transmission information is compensated using the code information. The viewership of the online live broadcast program is computed using the compensated transmission information.

In one embodiment, the code information is one of capturing time information representing time at which an image capturing device captures a scene to generated live broadcast data, encoding time information representing time at which the live broadcast data is encoded by the encoding server, and time information representing time at which the encoding server transmits the live broadcast data to the media server.

In one embodiment, the transmission information includes information representing time at which the media server transmitted the live broadcast data to the client.

In one embodiment, the transmission information includes at least one of a transmission rate, transmission traffic information, and a length of transmission of the live broadcast data.

In one embodiment, reproduction information of the transmitted live broadcast data is received from the client.

In one embodiment, the viewership of the online live broadcast program is computed by calculating the viewership of the online live broadcast program further using reproduction information of the live broadcast data.

In one embodiment, the reproduction information of the live broadcast data includes at least one of reproduction time information and reproduction method information of the live broadcast data in the client.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
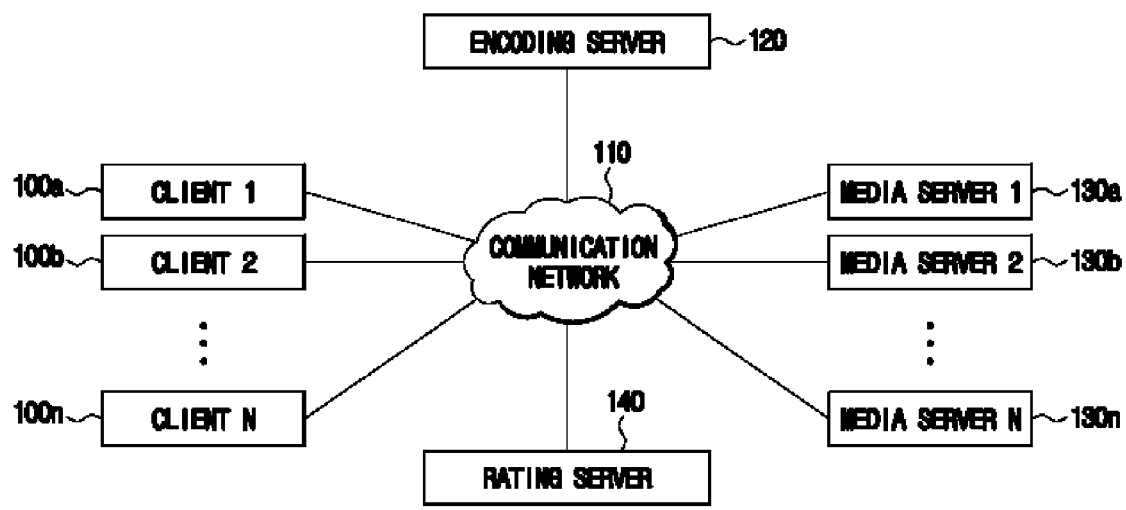
FIG. 1 is a diagram illustrating the architecture of a system for measuring audience viewership of an online live broadcast program according to an embodiment of the invention.

FIG. 1 is a diagram illustrating the architecture of a system for measuring audience viewership of an online live broadcast program according to an embodiment of the invention. The online live broadcast rating measuring system of FIG. 1 may include, among other components, clients 100a through 100n (hereinafter collectively referred to as "the clients 100"), an encoding server 120, one or more media servers 130a through 130n (hereinafter collectively referred to as the "media servers 130"), and a rating server 140. The online live broadcasting rating measuring system may include other components not illustrated in FIG. 1.

The client 100 is a device capable of sending a request and receiving live broadcast data from the media servers 130 through a communication network 110. In one embodiment, the client 100 includes a web browser (not shown) for establishing connection to the media servers 130 and an application (not shown) for reproducing the live broadcast data received from the media servers 130. The web browser and the application can be installed in the client 100 in the form of computer programs. The client 100 may be any device having a communication function of accessing the media servers 130, a program for reproducing the received live broadcast data can be installed therein, and a display screen for outputting the reproduced image. The client 100 may include, for example, a personal computer (PC) or a mobile terminal such as a mobile phone and a personal digital assistant (PDA).

The communication network 110 may include multiple processing systems. The communication network 110 may include a local area network (LAN), a wide area network (WAN) (e.g., the Internet), and/or any other interconnected data path across which multiple devices may communicate. Data in the communication network 110 may be distributed using network protocols such as User Datagram Protocol (UDP), Transmission Control Protocol and the Internet Protocol (TCP/IP), Hypertext Transfer Protocol (HTTP), Hypertext Transfer Protocol Secure (HTTPS) and Simple Mail Transfer Protocol (SMTP). The type and topology of the communication network 110 are not limited, and various communication network 110 may be used. The mobile communication networks include an access gateway enabling to transmit and receive wireless packet data and a PDSN (Packet Data Serving Node) in addition to base stations (BS), a mobile telephone switching office (MTSO), and a home location register (HLR).

Although not illustrated in FIG. 1, the online live broadcast rating measuring system according to one embodiment may include an image capturing device such as a camera. The image capturing device captures scenes of a live event, and sends data to the encoding server 120.

The encoding server 120 converts the images captures by the image capturing device into digital signals for transmission through the communication network 110. In one embodiment, the encoding server 120 generates code information indicating encoding of the digital signals for inclusion in a video signal and transmission over the communication network 110. The encoding server 120 adds the code information in the data for transmission to the media servers 130. The code information added to the live broadcast data may also include at least one of (i) first time information representing the time at which the video was captured by an image capturing device, (ii) second time information representing the time at which the encoding server 120 encoded the live broadcast data, and (iii) third time information at which the encoding server 120 transmitted to the live broadcast data to the media server 130.

The media servers 130 receive the encoded data (including the code information) and distribute the encoded data to the clients 100 through the communication network 110 responsive to receiving requests from the clients 100. In one embodiment, the media server 130 receives the live broadcast data from the encoding server 120, extracts the code information from the live broadcast data, and transmits the extracted code information to the rating server 140. The rating server 140 may also receive the code information included in the live broadcast data directly from the encoding server 120, in which case, the load of the encoding server 120 can be increased. On the contrary, when the media server 130 reads only the code information from the live broadcast data and transmits the code information to the rating server 140, the load of the encoding server 120 can be decreased but the load of the media server 130 can be increased.

In one embodiment, the rating server 140 is embodied as part of the media server 130. The media server 130 reads the code information from the live broadcast data to reduce the loads of both the encoding server 120 and the media server 130.

The rating server 140 may further receive transmission time information representing the time at which the media servers 130 transmit the live broadcast data to the clients 100. The transmission time information may be received from the media servers 130 or the clients 100.

As described above, the time when a specific event actually occurs and the time at which the media servers 130 transmit the live broadcast data to the clients 100 differ depending on the encoding time in the encoding server 120, the transmission time from the encoding server 120 to the media server 130, and the buffering and loading lags at the media server 130. One way of calibrating or adjusting such time difference to measure audience viewership is to (i) set the code information included in the encoding server 120 to one of the first time information, the second time information, and the third time information, and (ii) have the set code information indicate a reference time for calculating the audience viewership and compensating the time at which the media server 130 transmits the live broadcast data to the client 100.

Especially when a plurality of media servers 130 serve a plurality of clients 100 with the live broadcast data, the times at which the live broadcast data are transmitted may differ among different media servers 130 and the clients 100. Accordingly, it is more effective to compute the accurate viewership by using time information in the code information generated by the encoding server 120 for inclusion in the live broadcast data. The time information in the code information is the same regardless of different transmission time of the live broadcast data at different media servers 130, and hence, the time information can be used as reference data to compute the viewership for the clients 100 receiving the live broadcast data at different times and routes.

In one embodiment, the clients 100 generate and send feedback data representing the reception time or reproduction time of the live broadcast data to the media server 130 or the rating server 140 using the code information included in the live broadcast data responsive to receiving the live broadcast data from the media servers 130 for reproduction, The code information may also be extracted and fed back to the media server 130 or the rating server 140 depending on the setting of the code information. The rating server 140 can receive the code information from the client 100 via the media server 130 or directly from the clients 100. The rating server 140 then compensates the time information for rating the live broadcast data based on the code information received from the clients.

In compensating the time information, the same scene or the same time of the online live broadcast may be set as a reference for calculating the viewership. To measure the accurate viewership of an online live broadcast program, a reference is required to compensate the differences in the viewing time due to communication time between the components in the network 110 or the buffering times in the components in the network 110. Because the viewership is information indicating the viewer ratio at a specific time, it is necessary to set the same specific time as the reference to obtain accurate viewership. The same scene is displayed at a specific time of the event in an online program. Accordingly, the specific scene instead of the specific time may also be set as the reference for measuring the viewership.

The rating server 140 can compute the viewership using information about reception of the live online broadcast data or information about reproduction of the live broadcast data. The information about the reception or reproduction of the live broadcast data is fed back from the clients 100 to the rating server 140. As illustrated in FIG. 1, when the live broadcast data is transmitted to the clients 100 via the media servers 130, the times at which the clients 100 receives and reproduces the live broadcast data can be different from each other because of various reasons such as time needed for encoding or the status of the communication network 110. For example, in the above scenario where a national soccer team scored a goal at 7:50 pm but the media server 130 transmits the data to the clients at 7:52 pm and the viewers watches the scoring scene at 7:53 pm on their clients 100, the viewers watching the scene at 7:53 pm based on data transmitted from the media server 130 at 7:52 pm may be excluded from the counts for the scoring scene at 7:50 pm even though these viewers actually watched events without compensating the time information. To accurately measure the audience viewership of the scoring scene, all actual viewers watching the scene must be included in the count for the audience rating.

For the purpose of performing time compensation, the code information is included in the live broadcast data when the encoding server 120 encodes the live broadcast data. The rating server 140 computes the audience viewership using the code information as a reference for the viewing time. Further, the rating server 140 may compute the viewership of the online live broadcast program using information about the time the clients 100 received or reproduced the online live broadcast program. By determining the viewership based on the information about the time the clients received or reproduced the online live broadcast program, it is possible to accurately compute the viewership of the online live broadcast program regardless of the encoding time or the status of the communication network 110. Further, even when the audience viewership is computed using only the transmission of the live broadcast data from the media server 130, the time for the audience viewership can be compensated across different media servers 130 and clients 100. Such compensation of time can be performed without installing a program or an additional device on the clients 100.

In one embodiment, the rating server 140 further receives the transmission rate, the transmission traffic information, and the reproduction method information from the media servers 130. The live broadcast data transmitted from the media server 130 may be reproduced by the application installed on the clients 100. The application installed on the clients 100 may generate and send information representing the reception time of the live broadcast data, information on reproduction start time of the live broadcast data, information on reproduction end time of the online broadcast data, and the reproduction method information to the rating server 140. Information indicating the reproduction start time and reproduction end time may also be generated at the web browser installed on the client 100 and sent to the rating server 140. Based on information indicating the transmission rate and transmission traffic information of the live broadcast data received from the media server 130 and the reproduction start and reproduction end time information received from the clients 100, the rating server 140 may compute the viewing time of the live broadcast data.

The rating server 140 may compute the viewing time using the transmission rate and the transmission traffic information of the live broadcast data received by the media server 130 and the reproduce start and end time information of the live broadcast data received by the client 100.

The rating information may represent not only whether a certain program was watched as a specific time point but also the length of time the program was viewed. The viewing period of the live broadcast data at the clients 100 can be determined using information about the reproduction start time and information about reproduction end time of the live broadcast data generated at the client 100. By further using the transmission rate and the transmission traffic information of the live broadcast data, more accurate time information indicating the period during which the live broadcast data is watched can be determined. The time information obtained in this manner is more accurate compared to viewership based on the length of time live broadcast data was transmitted from the media servers 130 to the clients. For example, when the reproduction time of the live broadcast data from the client 100 indicates 5 minutes but the time during which the data can be reproduced at the clients 100 is only 4 minutes based on the transmission rate and the transmission traffic information of the live broadcast data, the rating server 140 can determine that the time for reproducing the live broadcast data at the clients 100 was prolonged for some reason. The reason for the prolonged reproduction may include extended time required for buffering the live broadcast data. In such case, the rating server 140 determines that the actual viewing time is 4 minutes instead of 5 minutes.

In another example where the reproduction time of the live broadcast data is 4 minutes but the time during which the live broadcast data can be reproduced at the client 100 is 5 minutes based on the transmission rate and the transmission traffic information of the live broadcast data, the rating server 140 can determine that the live broadcast data was received but not viewed at the client 100. Hence, the rating server 140 can determine the actual viewing time as 4 minutes instead of 5 minutes.

By receiving information representing the reproduction time of the live broadcast data at the client 100 in addition to the transmission rate and the transmission traffic information of the live broadcast data from the media server 130 and determining the viewing time based on the received information, the rating server 140 can more accurate compute the viewing time of a program.

When the live broadcast data is provided using a web page, the application can be embodied in the form of a plug-in program functioning in conjunction with the web browser to reproduce the live online broadcast data.

Although the media server 130 and the rating server 140 are illustrated in FIG. 1 as being separate devices, the functions of the rating server 140 may be included in the media server 130.

Figure 2:
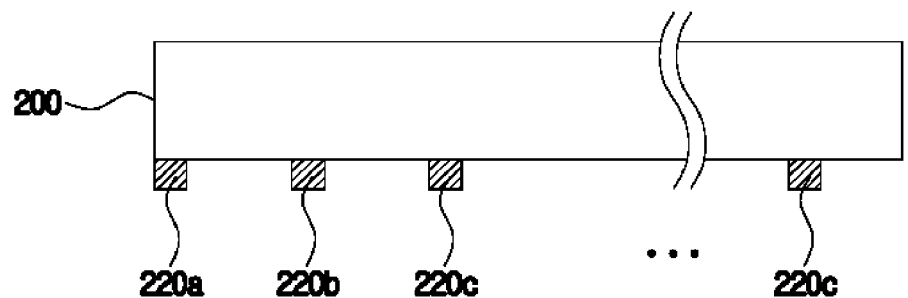
FIG. 2 is a diagram illustrating a schematic structure of live broadcast data for measuring audience viewership of an online live broadcast program, according to an embodiment of the invention.

FIG. 2 is a diagram illustrating a schematic structure of live broadcast data for measuring audience viewership of an online live broadcast program, according to one embodiment of the invention. The live broadcast data 200 encoded and then transmitted from the media servers 130 can be encoded to include at least one piece of code information 210*a* through 210*n* (hereinafter collectively referred to as "the code information 210"). The code information 210 can be included at any positions of the live broadcast data. Also, any counts of the code information 210 more than one may be included in the code information 210. As described above, various variables (e.g., the encoding time or the status of the communication network 110) can be included in the live broadcast data. As more pieces of code information 210 are included in the live broadcast data, the more accurate the time associated with the viewership becomes. For example, when the code information is included in the live broadcast data every 10 minutes, the granularity of viewership measurement of the live broadcast data can be 10 minutes.

When the code information is included immediately before and immediately after a specific scene (e.g., a scoring scene in a soccer game), the rating server 140 may receive the code information from the clients 100 and count the number of clients 100 watching the specific scene to determine the audience viewership of the scene.

Figure 3:
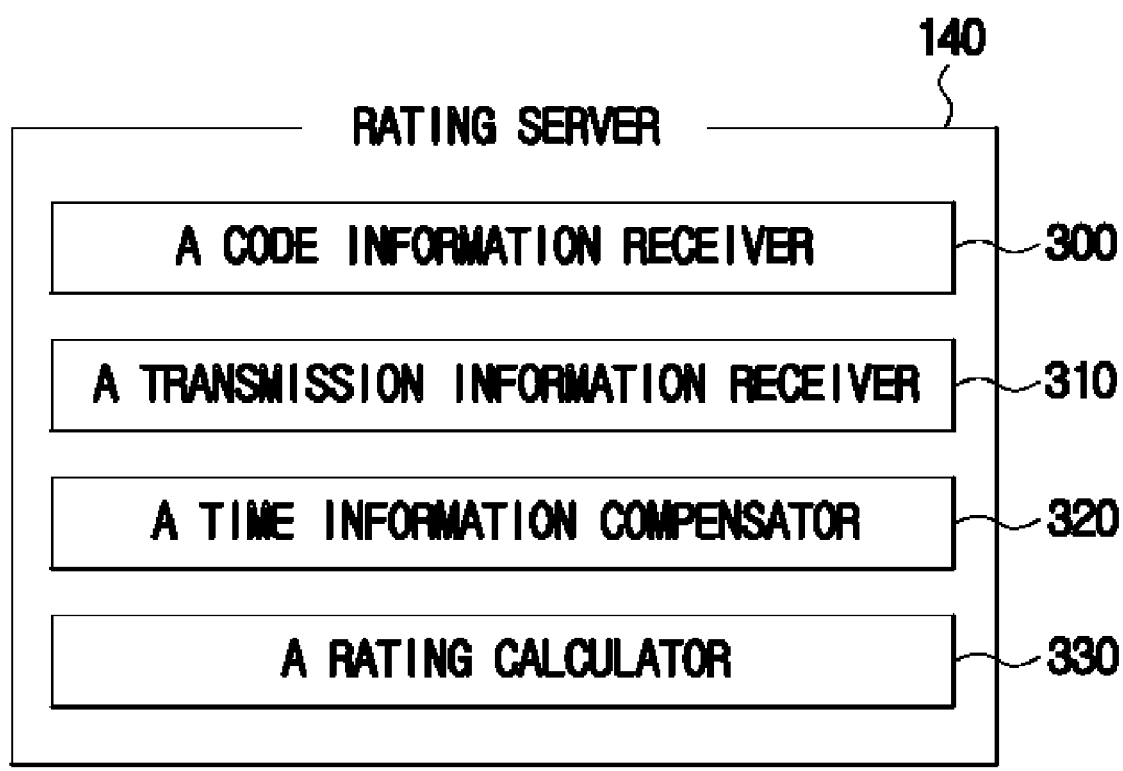
FIG. 3 is a functional block diagram illustrating a rating server according to the embodiment of the invention of FIG. 2.

FIG. 3 is a functional block diagram illustrating the configuration of the rating server 140 according to the embodiment of the invention of FIG. 2. The rating server 140 may include, among other components, a code information receiver 300, a transmission information receiver 310, a time information compensator 320, and a rating calculator 330. These components may be embodied as hardware, firmware, software or any combinations thereof.

The code information receiver 300 receives the code information included in the live broadcast data from the encoding server 120 or the media server 130. The code information may be one of the first time information, the second time information, and the third time information, as described above in detail with reference to FIG. 1. To more accurately compute the audience viewership, it is advantageous to set the first time information as the code information. The second time information and the third time information may also be set as the code information taking into account the time for the encoding server 120 to encode the live broadcast data or the time for the encoding server 120 to transmit the live broadcast data to the media server 130.

The transmission information receiver 310 receives the time information regarding the time at which the media server 130 transmitted the live broadcast data to the client 100 from the media servers 130. The transmission information receiver 310 can receive the transmission information of the live broadcast data including at least one of the transmission rate and the transmission traffic information of the live broadcast data transmitted from the media servers 130 to the client 100 and information about the lengths of transmission time from the media servers 130.

The code information receiver 300 and the transmission information receiver 310 can be embodied as part of a communication unit (not shown) of the rating server 140. The rating server can receive the reproduction information of the live broadcast data including the information on reproduction start time and the information on reproduction end time of the live broadcast data from the client 100 via the communication unit.

The time information compensator 320 compensates the transmissions time information received from the media server 130 at the transmission information receiver 130 using the code information received by the code information receiver 300 to obtain compensated time information for calculating the viewership of the online live broadcast program. An example of compensating the reference time for calculating the viewership of the online live broadcast program using the code information is as follows. If the time information included in the code information represents 7:50 pm as the time when the image capturing device captured a video image and the transmission time information of the live broadcast data indicated 7:52 pm as the time the information was transmitted, the transmission time information is updated to 7:50 pm. This updated transmission time information can be associated with the information on the client 100 receiving the live broadcast data and the information on the live broadcast data. The association of the information on the client 100 and the information on the broadcast data may be stored in the rating server 140 to accurately determine the clients viewing the broadcast data. For example, when the scoring scene at 7:50 pm is transmitted from the media server 130*a* to the client 100*a* at 7:52 pm and the scoring scene of 7:50 pm is transmitted from the media server 130*b* to the client 100*b* at 7:53 pm, the rating server 140 includes viewers of both the clients 100*a* and 100*b* as watching the scoring event.

The rating calculator 330 computes the viewership of the live broadcast data using the time information compensated by the time information compensator 310. The rating calculator 330 can compute the viewing time in addition to determining the ratio a specific scene was watched by users. The actual viewing time of the live broadcast data at the clients 100 can be more accurately computed by receiving the transmission information along with the transmission rate and the transmission traffic information of the live broadcast data transmitted to the client 100 and the information about lengths of transmission time of the live broadcast data from the media server 130 and comparing the received information with the transmission time information of the live broadcast data received from the clients 100. Because the compensated time information can be matched with the information on the client 100 and the information on the live broadcast data, the viewership can be computed per users or per online live broadcast programs.

Unlike conventional methods of sampling audiences for survey, embodiments allow viewership to be computed based on all the users receiving the live broadcast data from the media server 130, resulting in a highly reliable viewership information. Also, by calculating the viewership of the live broadcast data using both the transmission information of the live broadcast data and the reproduction information of the live broadcast data at the clients 100, more accurate audience viewership can be computed.

Although the rating server 140 is illustrated in FIGS. 1 and 3 as being independent of the media server 130, the functions of the rating server 140 may be included in the media server 130.

Figure 4:
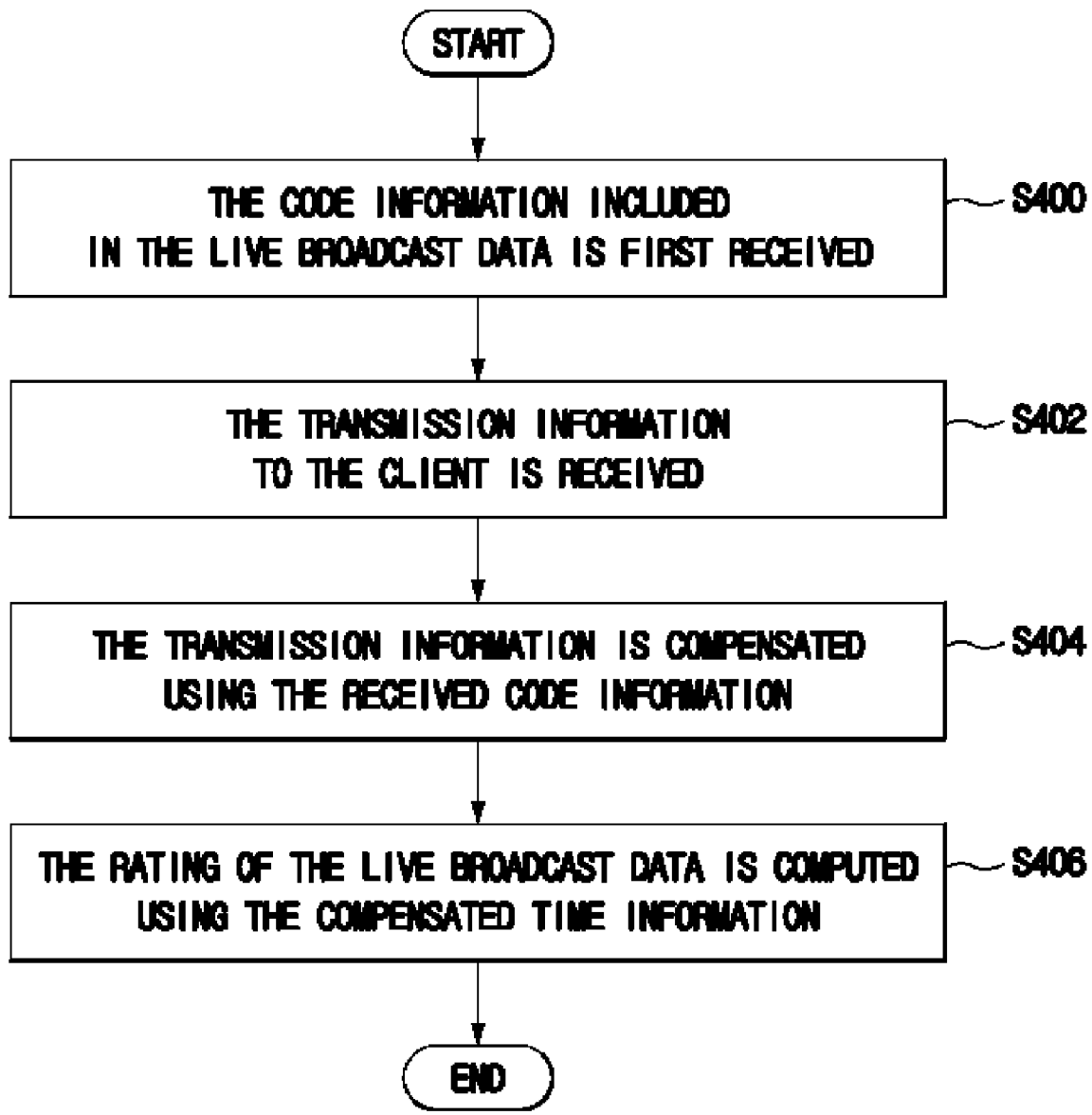
FIG. 4 is a flowchart illustrating a method of measuring the viewership of an online live broadcast program according to one embodiment of the invention.

FIG. 4 is a flowchart illustrating the method of measuring the viewership of an online live broadcast program, according to one embodiment of the invention. The code information included in the live broadcast data is first received S400 from the encoding server 120 or the media server 130. The received code information is included in the live broadcast data by the encoding server 120 when encoding the live broadcast data, as described above. The code information may be one of the first time information indicating the time at which the image capturing device captures a video image, the second time information indicating the time at which the encoding server encodes the live broadcast data, and the third time information indicating the time at which the encoding server transmits the live broadcast data to the media servers 130.

The transmission information to the client 100 is received S402 from the media servers 130. The transmission information to the client 100 received from the media servers 130 can include the transmission rate and the transmission traffic of the live broadcast data transmitted from the media servers 130 to the client 100 and information on the time length of transmission of the live broadcast data, in addition to the information on the clients 100 to which the live broadcast data are transmitted and the transmission time information indicating the time at which the live broadcast data is transmitted to the client 100.

When the online live broadcast data is reproduced by the client 100, the reproduction information of the live broadcast data can be further received from the client 100 and the reproduction information of the live broadcast data can include information on the reproduction start time and information on the reproduction end time of the live broadcast data.

When the code information included in the live broadcast data and the transmission information of the live broadcast data to the client are received, the transmission information is compensated S404 using the received code information. When compensating the transmission information, the transmission time information from the media server 130 is updated using the code information as the reference time information for calculating the viewership of the online live broadcast program.

After the transmission information (e.g., the transmission time) is compensated using the code information, the viewership of the live broadcast data is computed S406 using the compensated time information. The viewership may be computed to include the viewing period information in addition to whether a specific scene of a specific time was viewed.

The above-mentioned method of measuring the viewership of an online live broadcast according to the invention may be embodied by a computer program and may be stored in a computer readable storage medium such as a CD ROM, a RAM, a ROM, a floppy disk, a hard disk, and a magneto-optical disk. Instructions stored in the computer readable storage medium may be retrieved and executed by a processor in the components of the online live broadcast audience rating measuring system. The computer program stored in the computer readable storage medium includes computer instructions that can be retrieved and executed by processors in the components of the online live broadcast audience rating measuring system.

The above-mentioned embodiment of the invention is to exemplify the invention, and it will be understood by those skilled in the art that the invention may be subjected to modification, change, and addition in various forms without departing from the spirit and scope of the invention. The modifications, changes, and additions also belong to the scope of the appended claims.

The invention claimed is:

1. A method of measuring an audience viewership of an online live broadcast program in a rating server of an online live broadcast rating measuring system, the online live broadcast rating measuring system including a client, an encoding server, a media server, and the rating server, comprising:
   (a) receiving code information included in live broadcast data from the encoding server or the media server;
   (b) receiving transmission information of the live broadcast data to the client from the media server;
   (c) compensating the transmission information using the code information; and
   (d) calculating an audience viewership of the online live broadcast program using the compensated transmission information.

2. The method of claim 1, where the code information is one of capturing time information representing time at which an image capturing device captures a scene to generate live broadcast data, encoding time information representing time at which the live broadcast data is encoded by the encoding server, and time information representing time at which the encoding server transmits the live broadcast data to the media server.

3. The method of claim 1, wherein the transmission information includes information representing time at which the media server transmitted the live broadcast data to the client.

4. The method of claim 1, wherein the transmission information includes at least one of a transmission rate, transmission traffic information, and a length of transmission of the live broadcast data.

5. The method of claim 1, wherein receiving the transmission information comprises receiving reproduction information of the transmitted live broadcast data from the client.

6. The method of claim 5, wherein calculating the audience viewership of the online live broadcast program comprises calculating the audience viewership of the online live broadcast program further using reproduction information of the live broadcast data.

7. The method of claim 5, wherein the reproduction information of the live broadcast data includes at least one of reproduction time information and reproduction method information of the live broadcast data in the client.

8. An apparatus for measuring an audience viewership of an online live broadcast program in an online live broadcast rating measuring system, the online live broadcast rating measuring system including a client, an encoding server, and a media server, the apparatus comprising:
   a code information receiver configured to receive code information included in live broadcast data from the encoding server or the media server;
   a transmission information receiver configured to receive transmission information of the live broadcast data to the client from the media server;
   a time information compensator configured to compensate the transmission information using the code information; and
   a rating calculator configured to compute an audience viewership of the online live broadcast program using the compensated transmission information.

9. The apparatus of claim 8, wherein the code information is one of capturing time information representing time at which an image capturing device captures a scene to generate live broadcast data, encoding time information representing time at which the live broadcast data is encoded by the encoding server, and time information representing time at which the encoding server transmits the live broadcast data to the media server.

10. The apparatus of claim 8, wherein the transmission information includes information representing time at which the media server transmitted the live broadcast data to the client.

11. The apparatus of claim 8, wherein the transmission information includes at least one of a transmission rate, transmission traffic information, and a length of transmission of the live broadcast data.

12. The apparatus of claim 8, wherein the code information receiver and the transmission information receiver are included in a communication unit of the apparatus, and wherein the communication unit further receives reproduction information of the transmitted live broadcast data from the client.

13. The apparatus of claim 12, wherein the rating calculator is configured to compute the audience viewership of the online live broadcast program further using reproduction information of the live broadcast data.

14. The apparatus of claim 12, wherein the reproduction information of the live broadcast data includes at least one of reproduction time information and reproduction method information of the live broadcast data in the client.

15. The apparatus of claim 8, wherein the apparatus is included in the media server.

16. A computer-readable storage medium having stored thereon instructions, when executed by a processor in a rating server of an online live broadcast rating measuring system including a client, an encoding server, a media server, and the rating server, cause the processor to:
   (a) receive code information included in live broadcast data from the encoding server or the media server;
   (b) receive transmission information of the live broadcast data to the client from the media server;
   (c) compensate the transmission information using the code information; and
   (d) compute an audience viewership of the online live broadcast using the compensated transmission information.

* * * * *